United States Patent
Mroz et al.

(10) Patent No.: US 11,047,504 B2
(45) Date of Patent: Jun. 29, 2021

(54) FILLING MACHINE INCLUDING TWO-STAGE ACTUATOR FOR FILLING VALVE

(71) Applicant: FEDERAL MFG. LLC, Waukesha, WI (US)

(72) Inventors: Cezary Mroz, Elkhorn, WI (US); Mario Bele, Newport Beach, CA (US); Alexandru Berceanu, Quebec (CA)

(73) Assignee: FEDERAL MFG. LLC, Waukesha, WI (US)

( * ) Notice: Subject to any disclaimer, the term of this patent is extended or adjusted under 35 U.S.C. 154(b) by 36 days.

(21) Appl. No.: 16/408,147

(22) Filed: May 9, 2019

(65) Prior Publication Data
US 2019/0375620 A1  Dec. 12, 2019

Related U.S. Application Data

(60) Provisional application No. 62/681,148, filed on Jun. 6, 2018.

(51) Int. Cl.
*F16K 31/122* (2006.01)
*B67C 3/28* (2006.01)
*B67C 3/26* (2006.01)
*B67C 3/00* (2006.01)

(52) U.S. Cl.
CPC .......... *F16K 31/1225* (2013.01); *B67C 3/286* (2013.01); *B67C 3/007* (2013.01); *B67C 3/26* (2013.01); *B67C 2003/2605* (2013.01)

(58) Field of Classification Search
CPC ............................ F16K 31/1225; B67C 3/286
USPC ..................................................... 251/62, 296
See application file for complete search history.

(56) References Cited

U.S. PATENT DOCUMENTS

| | | | |
|---|---|---|---|
| 2,152,831 A | 4/1939 | Williams | |
| 3,110,471 A | 11/1963 | Kuhles | |
| 3,155,365 A * | 11/1964 | Hartung | F16K 31/122 251/25 |
| 6,354,116 B1 * | 3/2002 | Drake | F16K 35/06 137/382 |
| 6,546,970 B2 | 4/2003 | Gatteschi | |
| 6,761,191 B2 | 7/2004 | Rosen | |

(Continued)

FOREIGN PATENT DOCUMENTS

| | | | | |
|---|---|---|---|---|
| DE | 102018127592 A1 * | 5/2020 | ............. | B67C 3/286 |
| EP | 1433738 A1 * | 6/2004 | ............. | B67C 3/281 |
| EP | 1571119 A1 * | 9/2005 | ............. | B67C 3/285 |

*Primary Examiner* — Umashankar Venkatesan
(74) *Attorney, Agent, or Firm* — Thompson Hine LLP

(57) ABSTRACT

A filling system includes a filling valve including an outlet opening and a sealing member movable relative between an outlet closing position, an outlet fully open position and at least one outlet partially open position. A linear actuator operatively connected to move the sealing member, the linear actuator including a first member movable between an extend position and a retract position, and a second member movable between an extend position, a first retract position and a second retract position. The first retract position of the second member is defined by contact with a distal portion of the first movable member when the first movable member is in its extend position and the second retract position of the second member is defined by contact with the distal portion of the first member when the first member is in its retract position.

16 Claims, 8 Drawing Sheets

(56) References Cited

U.S. PATENT DOCUMENTS 6,814,338 B2 * 11/2004 Kajitani .............. F16K 31/1221
137/630
7,011,117 B1 3/2006 Carpino

* cited by examiner

FILLING MACHINE INCLUDING TWO-STAGE ACTUATOR FOR FILLING VALVE

TECHNICAL FIELD

This application relates generally to actuators used for filling valves and, more specifically, to a two-stage linear actuator for a filling valve.

BACKGROUND

The high-throughput filling of containers with liquids is accomplished using precision automated liquid filling systems. These high speed liquid filling systems are used for filling containers such as bottles, cans and jars with a wide variety of consumer products including foods, drinks, personal care products, home care products, automotive products, pharmaceuticals and more.

A typical liquid filling system includes a container handling device, a liquid filling machine and a capping/lidding machine. The container handling device transports unfilled containers to the liquid filling machine and then transports the filled containers from the filling machine to the capping/lidding machine. The container handling device commonly comprises one or more conveyors and may also include one or more indexing devices such as gates, star wheels or spindles. The liquid filling machine comprises a plurality of filling stations such that it can simultaneously fill multiple containers. Each filling station includes a nozzle and a valve connected to a source of liquid product such as a tank or reservoir. The nozzles direct liquid product into the container. The nozzle may be configured to physically engage the opening in the container, to be placed through the opening and into the interior of the container, or simply to be placed in the vicinity of the opening in the container. The liquid product may be delivered to the nozzles of each filling station using a pump such as a positive displacement pump, by a source of pressure such as compressed air, or simply by gravity feed.

The nozzle and valve may be separate components or they may be integrated into a single device. The valve is opened and closed to control the flow of liquid product that flows through the nozzle and into the container. In order to minimize foaming and splashing of product during the filling process, each filling station may include a bottom-up fill mechanism which places the nozzle tip in the vicinity of the bottom of the container at the initiation of the filling process and then withdraws the nozzle as the container is filled and the product level rises. The relative movement of the nozzle and the container may be accomplished by lowering and raising the nozzle, the container or both. The system may also include a labeling machine and a packing station for packing a plurality of filled containers into cartons or boxes for shipping.

Liquid filling machines are generally of two types, rotary filling machines and in-line filling machines. Because it easily allows for fast continuous motion of containers, rotary filling machines are the fastest known architecture. A typical rotary filling machine includes a plurality of filling stations arranged around the circumference of a revolving rotor. Each filling station includes a filling device typically having a nozzle and a container holding device for securely holding and aligning each container as the containers rotate with the rotor during the filling process. Each nozzle is connected to a valve that controls the feed of material through the nozzle.

In-line filling systems are characterized by the motion of the containers in a generally straight line through the product filling area. There are many types of in-line filling systems, but they can be broken down into two types of motion, namely intermittent motion and continuous motion. In the intermittent motion designs, a group of empty containers are serially conveyed or indexed into a plurality of filling stations. The containers are then completely filled while they remain fixed and motionless. Once this group of containers is filled, an indexing mechanism transports the filled group of containers out of the filling area and another group of empty containers are conveyed into the position of the filling stations. In order to increase the throughput of this type of in-line filling system, various derivative designs have been devised to increase the throughput. These include the multiple parallel lane and nozzle design, the dead plate pushover design, the shifting nozzle design, and the parallel lane/staggered nozzle design. It is also possible to have an in-line filling system which provides for continuous motion of the containers. For example, walking beam filling systems includes a conveyor which transports containers to and from the liquid filling zone.

Each of the liquid filling systems requires one or more valves in the system to precisely dispense the desired amount of liquid product into the containers being filled. Various types of valves have been used in automated liquid filling machines. More effective and precise control of filling valves is sought.

Accordingly, it would be desirable to provide a filling valve actuator that provides effective control of a filling valve as between fully open, partially open and fully closed positions.

SUMMARY

In one aspect, a filling system includes a filling valve including an outlet opening and a sealing member movable relative to the outlet opening between an outlet closing position, an outlet fully open position and at least one outlet partially open position. A linear actuator is operatively connected to move the sealing member, the linear actuator including a first member movable between an extend position and a retract position, and a second member movable between an extend position, a first retract position and a second retract position, wherein the first retract position of the second member is defined by contact with a distal portion of the first movable member when the first movable member is in its extend position.

In a further aspect, a filling system includes a filling valve including an outlet opening and an axially movable plunger having a sealing end movable relative to the outlet opening between an outlet closing position, and outlet fully open position and at least one outlet partially open position. A pneumatic actuator is operatively connected to move the plunger, the pneumatic actuator including an upper piston assembly movable between a down position and an up position, and a lower piston assembly movable between a down position and an up position. The up position of the lower piston assembly is defined by contact with a lower portion of the upper piston assembly to provide a first lower piston assembly up position when the upper piston assembly is in its down position and a second lower piston assembly up position when the upper piston assembly is in its up position.

In another aspect, a filling system includes a filling valve including an outlet opening and a sealing member movable relative to the outlet opening between an outlet closing position, an outlet fully open position and at least one outlet partially open position. A pressure controlled actuator is operatively connected to move the sealing member. The actuator includes a first piston assembly movable between an extend position and a retract position, and a second piston assembly movable between an extend position, a first retract position and a second retract position. The first retract position of the second piston assembly is defined by contact with a distal portion of the first piston assembly when the first piston assembly is in its extend position, and the second retract position of the second piston assembly is defined by contact with the distal portion of the first piston assembly when the first piston assembly is in its retract position.

In yet another aspect, a method of controlling a filling valve to fill a container with a material is provided, wherein the filling valve includes an outlet opening and a sealing member movable relative to the outlet opening between an outlet closing position, at least one outlet partially open position and an outlet fully open position. The method involves: utilizing a linear actuator operatively connected to move the sealing member, the linear actuator including an upper member movable between a down position and an up position, and a lower member movable between a down position and at least a first up position and a second up position that is higher than the first up position; controlling the linear actuator to place the upper member in its down position and the lower member to be in contact with a lower portion of the upper member to establish the first up position of the lower member, which places the sealing member in the outlet partially open position to dispense the material at a first flow rate; and controlling the linear actuator to place the upper member its up position and the lower member to be in contact with the lower portion of the upper member to establish the second up position of the lower member, which places the sealing member in the outlet fully open position to dispense the material at a second flow rate, which is higher than the first flow rate.

The details of one or more embodiments are set forth in the accompanying drawings and the description below. Other features, objects, and advantages will be apparent from the description and drawings, and from the claims.

DETAILED DESCRIPTION

Figure 1:
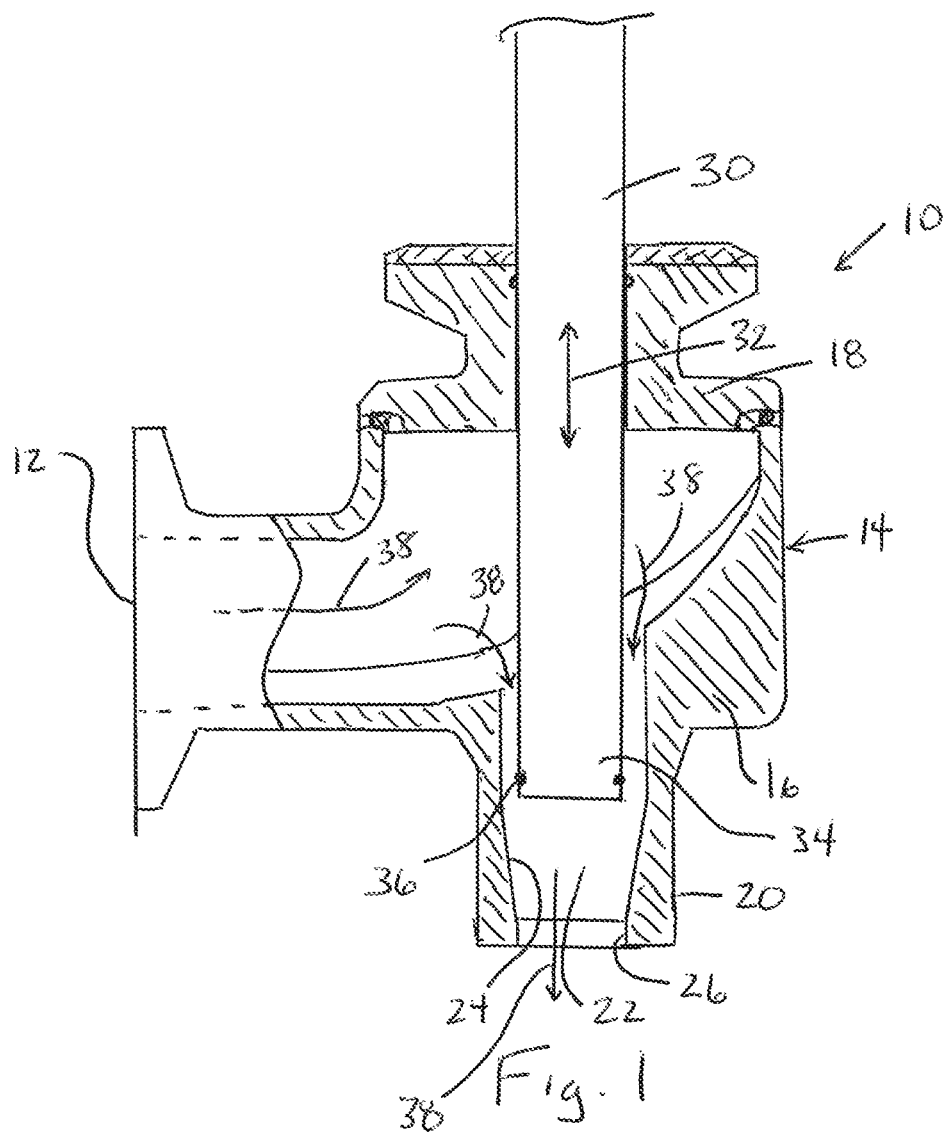
FIG. 1 is a schematic cross-section of a filling valve in full open position.
Figure 2:
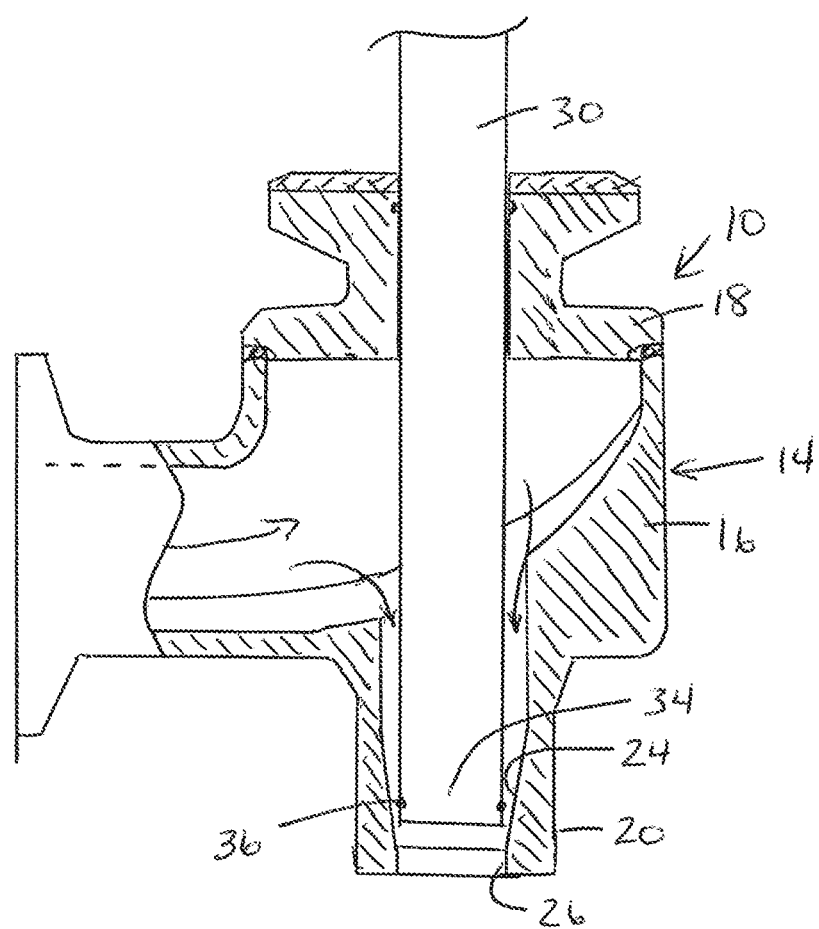
FIG. 2 is a schematic cross-section of the filling valve in a mid-open position.
Figure 3:
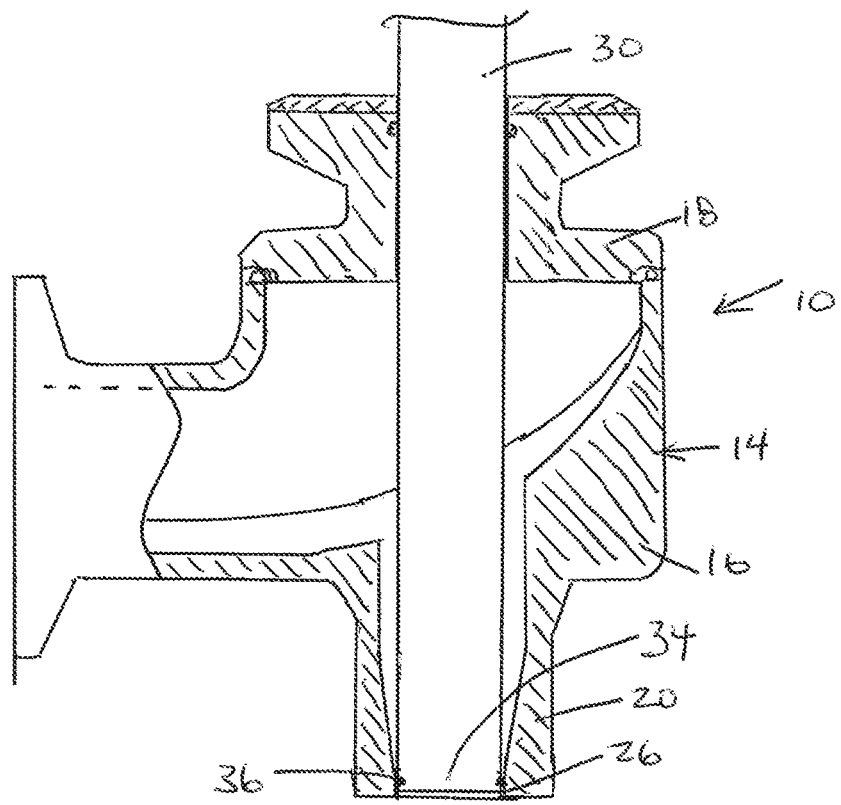
FIG. 3 is a schematic cross-section of the filling valve in a closed position.
Figure 4:
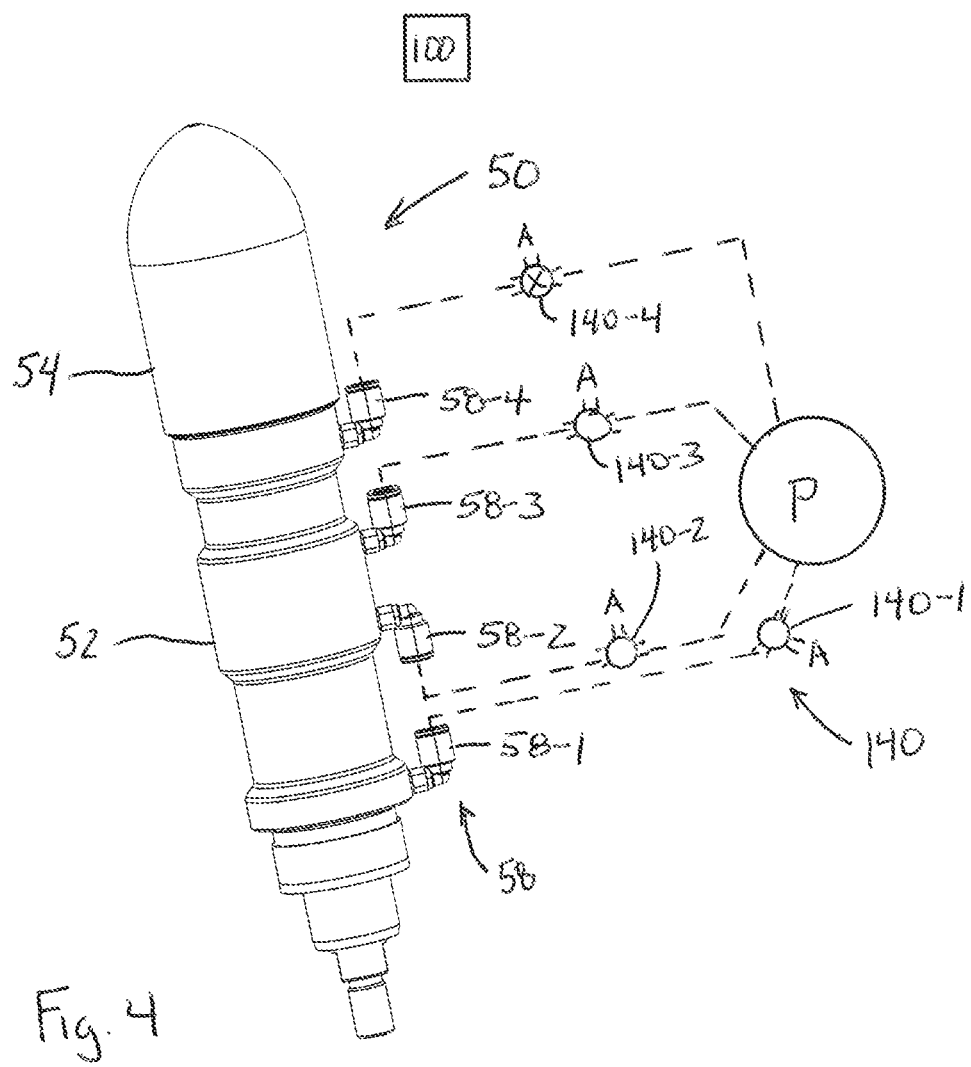
FIG. 4 is schematic perspective of a valve actuation system.

Referring to FIGS. 1-3, a filling valve 10 configured for staged flow control is shown. The valve 10 includes a product inlet port 12 that may be connected to a supply pipe or hose, with a sanitary inlet seal provided between the supply pipe and the inlet port 12 to provide a liquid tight seal. A valve housing 14 has a base 16 and a cap 18. The base 16 includes a lower extension 20 that surrounds an outlet passage 22 of the valve. The outlet passage 22 includes a tapering section 24 (e.g. frustoconical) that leads down to a cylindrical valve seat section 26. A plunger 30 is movable up and down per arrow 32 for control of the flow condition of the valve. The lower end 34 of the plunger is sized to seal against the valve seat section 26 when aligned therewith, and includes an external sealing member 36 to aid in sealing. In the plunger position shown in FIG. 1, with plunger fully raised to place the lower end 34 in a position above the tapered section 24, the outlet passage 22 is considered fully open, allowing material to flow at a highest flow rate permitted by the valve, per arrows 38, around the lower end of the plunger and out of the valve. In the plunger position shown in FIG. 2, the plunger is lowered to an intermediate position to place the lower end 34 along the tapered section 24, to restrict flow through outlet passage to a lower flow rate due to the smaller flow area between the external surface of the plunger lower end and the internal surface of the tapered section 24. In the plunger position shown in FIG. 3, the plunger is fully lowered to place the lower end 34 in alignment with the valve seat section 26, with seal 36 in contact with the valve seat section surface, thereby closing the outlet passage 22 and stopping flow through the valve. The lower extension 22 may be connected to a nozzle that is insertable into a container for filling the container. Control of the plunger position is achieved using a pneumatic actuator as described below.

FIGS. 4-7 show one embodiment of a pneumatic actuator 50 having a main cylinder housing 52 with a removable top cap member 54. Here, the cap member may connect by sliding on and off of the housing 52 with a sealing ring 56 at a lower end of the cap member to provide a snug retention fit on the housing. The cap member could alternatively thread onto the top end of the housing 52. A plurality of air ports 58-1, 58-2, 58-3 and 58-4 enable control of the movable components of the actuator. In this regard, both an upper piston assembly 60 and lower piston assembly 62 are provided within the housing, each of which is movable along the actuator axis 200.

The upper piston assembly 60 includes a central shaft 64 passing through an axial bore 66 in a movable piston body 68, which piston body 68 includes a lower piston disc 70 with an upward tubular extension 72. The piston disc 70 includes upper and lower annular bearing plates 74, 76 and a set of seals, including external seals 78, 80 within respective annular channels in the outer surface of the disc and in contact with the inner surface of the housing 52, and an internal seal 82 within an annular channel in the inner surface of the bore 66 and in contact with the external surface of the shaft 64. The piston disc 70 is located in a space between an upper stop cylinder 84 and a middle stop cylinder 86, the positions of which are fixed relative to the housing 52. The upper stop cylinder 84 includes an external seal 88 engaged with the internal surface of the housing and internal seal 90 engaged with the external surface of the tubular extension 72. The middle stop cylinder 86 may be held in place by upper and lower snap rings engaged with internal recesses of the housing 52. The middle stop cylinder 86 includes an external seal 92 engaged with the internal surface of the housing 52 and an internal seal 94 engaged with the external surface of the shaft 64.

The lower piston assembly 62 includes a piston body 110 with an upper side having a central recess 112 with an internal seal 114, where the recess aligns with and is sized to receive the shaft bottom end or distal end 116. The piston body includes external seals 118, 120 within respective annular channels in the outer surface of the piston body and in contact with the internal surface of the housing 52 and a lower annular bearing plate 122. An upper head portion 124 of the piston body is positioned between the stop cylinder 86 and a lower stop cylinder 126. A lower portion 128 of the piston body 110 passes downward through a bore in the lower stop cylinder and protrudes from the bottom of the assembly to define a bottom end portion 130 that can be coupled to a structure to be moved (e.g., coupled directly or indirectly to the valve plunger 30 described above). The lower stop cylinder may be threadedly engaged into the lower end of the housing 52 until its bottom flange 127 engages the bottom edge of the housing 52 as shown.

The subject actuator configuration with multiple ports provides the ability to shift the upper piston assembly 60 and the lower piston assembly 62 independently of each other. Specifically, the upper piston assembly is movable between a down position (FIGS. 5 & 6—with the bottom of the piston disc 70 adjacent the top of the middle stop cylinder 86) and an up position (FIG. 7—with the top of the piston disc 70 adjacent the bottom of the upper stop cylinder 84). The lower piston assembly is movable between a down position (FIG. 5—with the bottom of the head portion 124 adjacent the top of the stop cylinder) and at least two up positions (FIGS. 6 & 7—in which the top recess 112 engages on the shaft bottom end 116). This collective set of upper and lower piston assembly positions creates three different extension distances D1, D2, D3 of the bottom end 130 of the lower piston assembly, where D1>D2>D3. Distance D1 corresponds to and effects the valve closed position (FIG. 3), distance D2 corresponds to and effects the valve intermediate open position (FIG. 2) and distance D3 corresponds to and effects the valve full open position (FIG. 1). The air ports 58-1, 58-2, 58-3 and 58-4 provide for the straightforward control of the positions of the upper and lower piston assemblies as follows.

Each air port 58 is selectively connectable to either a pressurized air source P or to ambient atmosphere A. For example, each port may include an associated valve 140-1, 140-2, 140-3 and 140-4 that moves between a position connected to the air pressure P and a position connected to ambient A, as suggested schematically in FIG. 4, where the valve position is switched by a machine controller 100. A typical, exemplary sequence for control of the valves during a container fill operation is set forth in the Table 1 below, where an A designation reflects the valve connecting a port to atmosphere and a P designation reflects a valve connecting a port to pressurized air source P.

TABLE 1

| | Fill Cycle Valve Sequence | | | | | | |
|---|---|---|---|---|---|---|---|
| Step | Valve 140-1/ Port 58-1 | Valve 140-2/ Port 58-2 | Valve 140-3/ Port 58-3 | Valve 140-4/ Port 58-4 | Lower Piston Assembly Position | Upper Piston Assembly Position | Filling Valve Position |
| 1 | A | P | A | P | DOWN | DOWN | CLOSED |
| 2 | P | A | A | P | UP | DOWN | MID-OPEN |
| 3 | P | A | P | A | UP | UP | FULL-OPEN |
| 4 | P | A | A | P | UP | DOWN | MID-OPEN |
| 5 | A | P | A | P | DOWN | DOWN | CLOSED |

Figure 5:
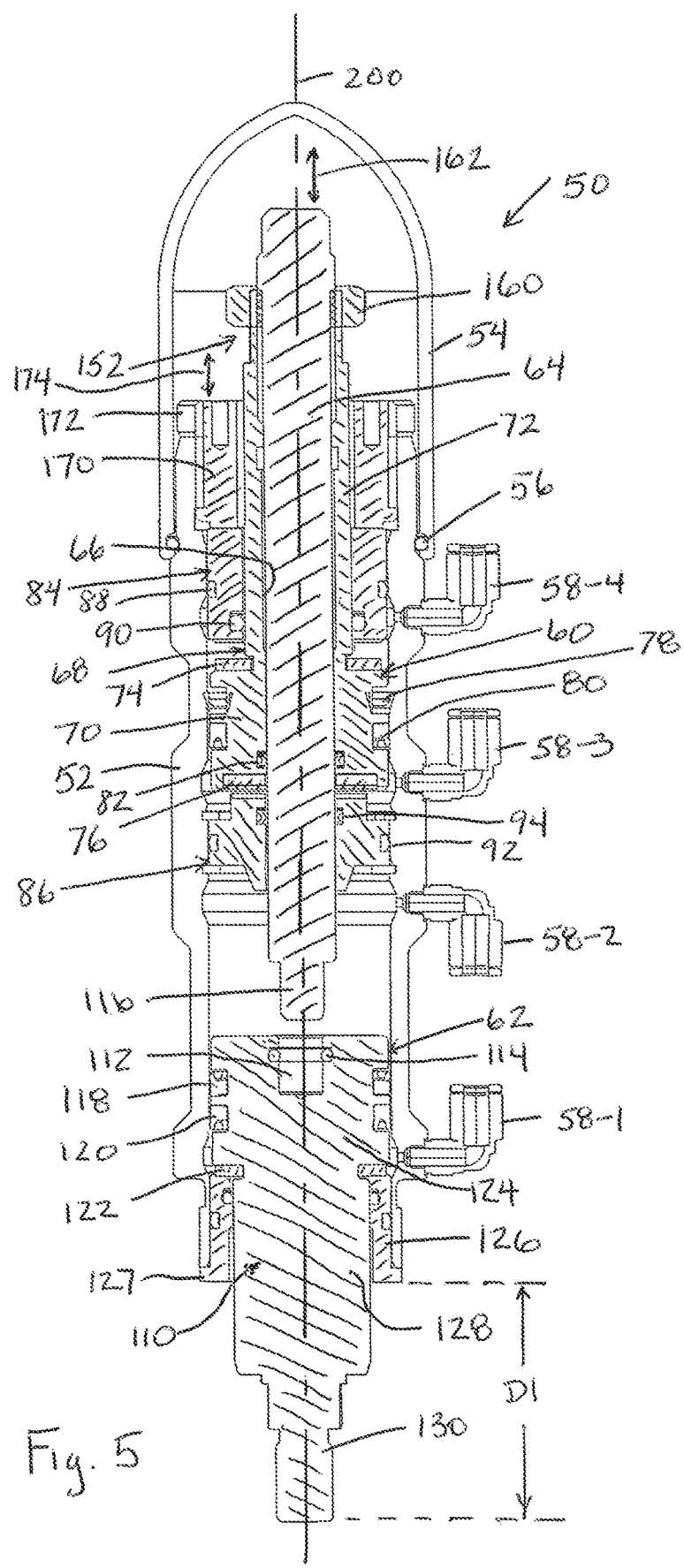
FIG. 5 is a cross-section of the actuator with both piston assemblies down.
Figure 6:
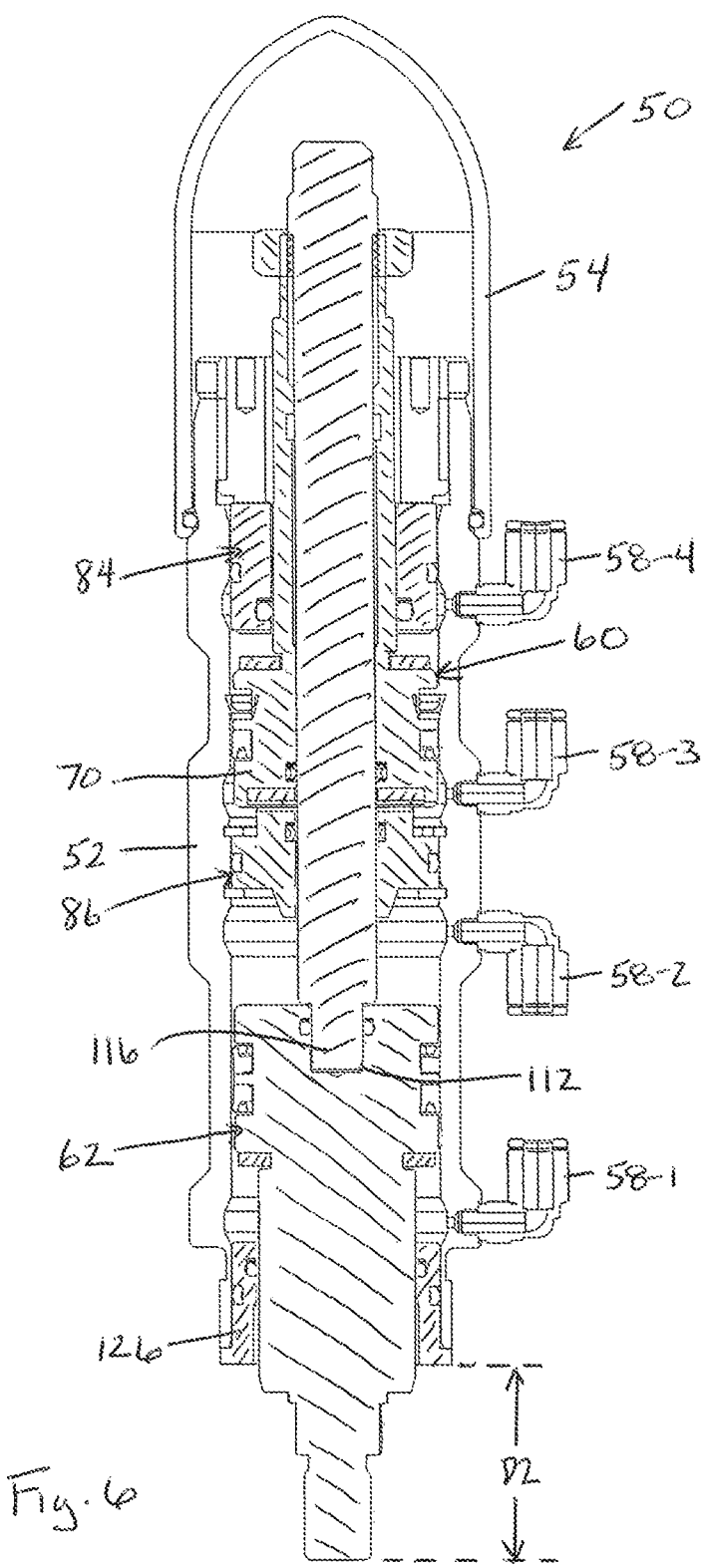
FIG. 6 is a cross-section of the actuator with upper piston assembly down and lower piston assembly up.
Figure 7:
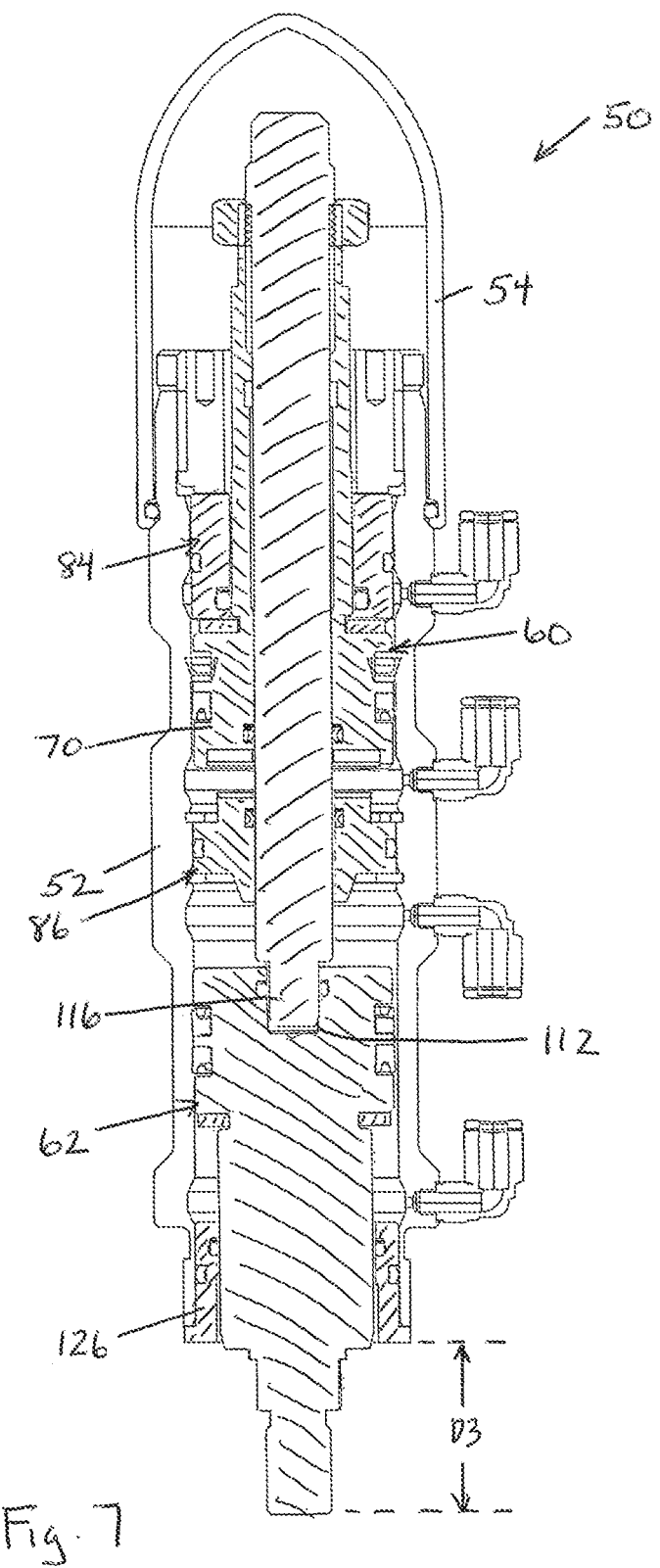
FIG. 7 is a cross-section of the actuator with upper piston assembly up and lower piston assembly up.

The above sequence moves the actuator 50 between the positions reflected in FIGS. 5-7 and the valve between the positions reflected in FIGS. 1-3. Specifically, Step 1 corresponds to the actuator position shown in FIG. 5 and valve position of FIG. 3, Step 2 corresponds to the actuator position of FIG. 6 and valve position of FIG. 2, Step 3 corresponds to the actuator position of FIG. 7 and valve position of FIG. 1, Step 4 corresponds to the actuator position of FIG. 6 and valve position of FIG. 2, and Step 5 corresponds to the actuator position of FIG. 5 and valve position of FIG. 3.

Notably, pressurized air applied at port 58-1 urges the lower piston assembly 62 upward, while pressurized air applied at port 58-2 urges the lower piston assembly downward. Likewise, pressurized air applied at port 58-3 urges the upper piston assembly upward, while pressurized air applied at port 58-4 urges the upper piston assembly downward. Only one of the pair of ports 58-1 and 58-2 receives pressure at any given time and only one of the pair of ports 58-3 and 58-4 receives pressure at any given time. Pressurized air applied at port 58-4 operates on an upper pressure action surface area of the upper piston assembly and pressurized air applied at port 58-1 operates on a lower pressure action surface area of the lower piston assembly. The piston assemblies are configured so that the upper pressure action surface area of the upper piston assembly is larger than the lower pressure action surface area of the lower piston assembly. In this manner, when the same fluid pressure is applied to ports 58-1 and 58-4, the upper piston assembly 60 dominates the lower piston assembly 62; meaning that the upper piston assembly can shift the position of the lower piston assembly downward, but the lower piston assembly cannot shift the position of the upper piston assembly upward.

Figure 8:
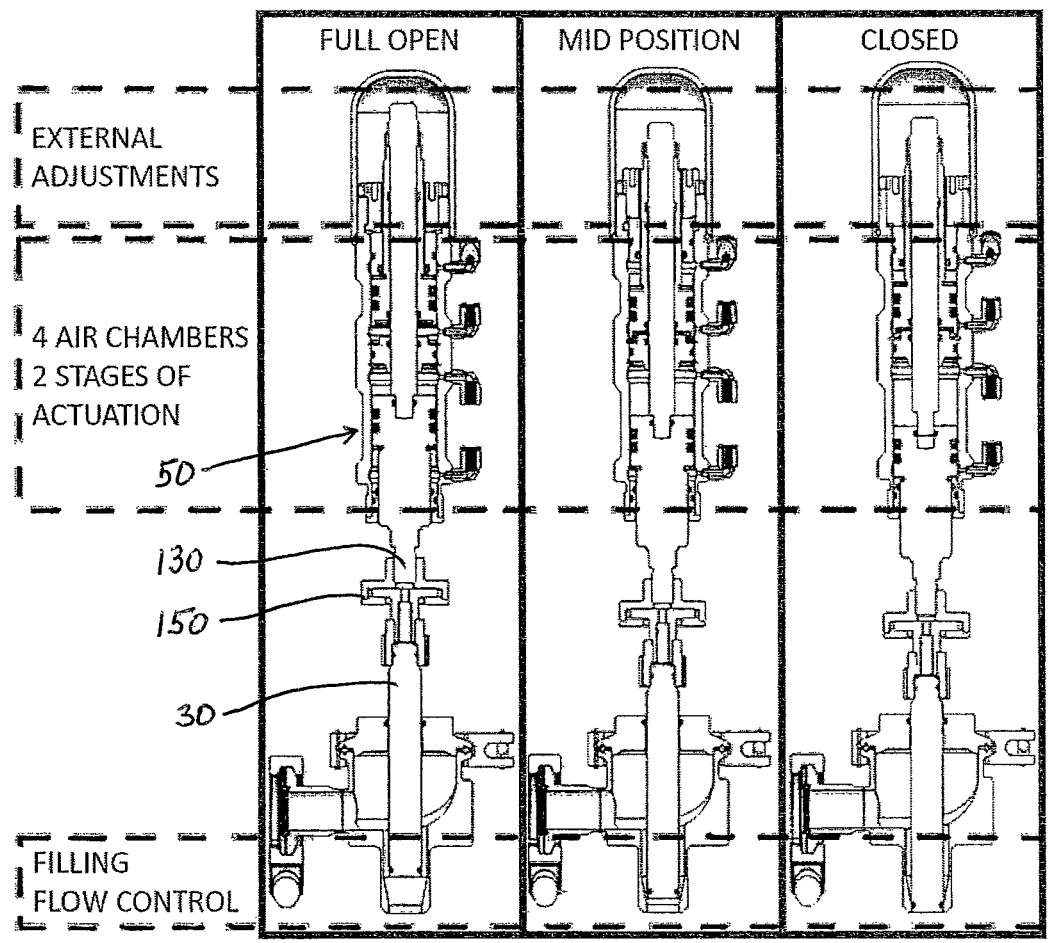
FIG. 8 is a schematic view of actuator in combination with filling valve for the full open, mid-open and closed valve conditions.

FIG. 8 schematically shows the actuator 50 in combination with a filling valve and effecting the closed, mid open and full open positions, where a coupler 150 threadedly connects to the bottom end 130 of the lower piston assembly and threadedly connects to the top end of the valve plunger 30.

As suggested in FIG. 8, the upper part of the actuator 50 enables manual adjustment of the actuator assembly in order to vary the mid position of the actuator. Specifically, as seen in FIG. 5, a threaded coupling 152 connects the top of the shaft 64 to the top of the tubular portion 72 of the piston body 68. The threaded coupling can be loosened to adjust a relative position of the shaft 64 along the bore 66 of the piston body 68. In this manner, the actuator can be adjusted to define different valve flow rates at the mid position as needed for a given container being filled with a given material. In this regard, the shaft 64 is threadedly engaged within at least the tubular portion 72 of the piston body and a lock nut 160 fixes the axial position of the shaft 64 along the piston body 68. When the lock nut 160 is loosened, the shaft 64 can then be rotated further downward within the tubular body or further upward within the tubular body per arrow 162, and the nut 160 retightened to fix the new position. A further upward fixed position of the shaft 64 corresponds to a higher amount of valve flow when the piston assembly is in the mid-open position. Likewise, a further downward fixed position of the shaft 64 corresponds to a lower amount of valve when the piston assembly is in the mid-open position. The selection can be varied as needed for a given material, container type and needed fill speed being handled by the filling machine. In addition to the adjustment provided by the shaft 64 and lock nut 160, further adjustment may be achieved by varying the position of the upper sleeve member 170, which is threadedly engaged into the upper end of the housing 52 and locked in place by lock nut 172. By loosening the luck nut 172 the axial position of the sleeve member 170, the position of which limits the upward position of the upper stop cylinder 84, can be moved up or down per arrow 174 by rotation of the sleeve member 170, and the lock nut then tightened again to fix the adjusted position of the sleeve member 170. The degree of adjustment achievable by these threaded connections can vary, and in some cases the mid-position of the actuator can effectively be eliminated (i.e., placing the top end of piston body 110 adjacent the lower end of middle stop cylinder 86 when the ports 58 are controlled for the mid-open position of the actuator). In the case of either adjustment, the retracted position of the lower piston assembly when the ports are operated for the full open condition may also adjust. However, this adjustment has little or no effect on flow through the valve because, once the valve is fully open, further upward movement of the plunger does not change flow through the valve.

It is to be clearly understood that the above description is intended by way of illustration and example only, is not intended to be taken by way of limitation, and that other changes and modifications are possible. For example, the exact configuration of the actuator internals could vary while at the same time providing an actuator with two independently movable piston assemblies where one dominates the other. In addition, although four port valves 140 are shown, the number could vary, such as including one valve for simultaneous switching of ports 58-1 and 58-2 and another valve for simultaneous switching of ports 58-3 and 58-4. Moreover, while reference to pressurized air is made above, it is recognized that any pressurized fluid could be used to control the state of the actuator. Further, while the primary orientation contemplated for use of the actuator in a filling machine is a vertical orientation in which the piston assemblies move up and down to control a filling valve, other orientations may be possible. As such, the up and down positions can also be referred to as retract and extend positions of the piston assemblies, regardless of actuator orientation.

Further, a similar actuator assembly could be achieved in the case of, for example, solenoid activated actuators. For example, the upper piston assembly/movable member could be biased into its lower position by an upper spring, with an upper solenoid actuated to move the upper piston assembly to its raised position by overcoming the spring bias. Likewise, the lower piston assembly/movable member could be biased into its lower position by a lower spring, with a lower solenoid actuated to move the lower piston assembly upward by overcoming the spring bias. In such an actuator, the downward spring bias force of the upper spring could be selected stronger than the upward force of the lower solenoid to enable the upper piston assembly to dominate the lower piston assembly in a manner similar to that described above.

What is claimed is:

1. A filling system, comprising:
    a filling valve including an outlet opening and a sealing member movable relative to the outlet opening between an outlet closing position, and outlet fully open position and at least one outlet partially open position;
    a linear actuator operatively connected to move the sealing member, the linear actuator including a first member movable between an extend position and a retract position, and a second member movable between an extend position, a first retract position and a second retract position, wherein the first retract position of the second member is defined by contact with a distal portion of the first member when the first member is in its extend position;
    wherein the second retract position of the second member is defined by contact with the distal portion of the first member when the first member is in its retract position;
    wherein the linear actuator is a pressure controlled actuator including a housing, the first member is a first piston assembly at least partially within the housing and the second member is a second piston assembly at least partially within the housing;
    a first port and a second port through the housing for controlling pressure at opposite sections of the second piston assembly to control movement of the second piston assembly; and
    a third port and a fourth port through the housing for controlling pressure at opposite sections of the first piston assembly to control movement of the first piston assembly.

2. The filling system of claim 1 wherein a position of the distal portion of the first piston assembly along an axial length of the first piston assembly is manually adjustable.

3. The filling system of claim 2 wherein a lockable threaded connection is provided to enable adjustment of the position of the distal portion of the first piston assembly along the axial length of the first piston assembly.

4. The filling system of claim 3 wherein the pressure controlled actuator includes a removable cover to provide access to the lockable threaded connection.

5. The filling system of claim 1 wherein:
    pressurized fluid applied at the first port urges the second piston assembly in a retract direction and pressurize fluid applied at the second port urges the second piston assembly in an extend direction;
    pressurized fluid applied at the third port urges the first piston assembly in the retract direction and pressurize fluid applied at the fourth port urges the first piston assembly in the extend direction.

6. The filling system of claim 5 wherein:
    when pressurized fluid is applied at the first port and the fourth port, an extend direction urging force on the first piston assembly is greater than a retract direction urging force on the second piston assembly.

7. The filling system of claim 1, further comprising:
a set of port valves for selectively connecting each of the first, second, third and fourth ports to either a pressurized fluid source or ambient; and
a controller connected to the set of port valves to carry out a container fill operation by sequentially moving the second piston assembly from the extend position, then to the first retract position, then to the second retract position, then to the first retract position and then back to the extend position.

8. A filling system, comprising:
a filling valve including an outlet opening and an axially movable plunger having a sealing end movable relative to the outlet opening between an outlet closing position, an outlet fully open position and at least one outlet partially open position;
a pneumatic actuator operatively connected to move the plunger, the pneumatic actuator including:
a cylinder housing;
an upper piston assembly movable along the cylinder housing between a down position and an up position, and
a lower piston assembly movable along the cylinder housing between a down position and at least a first up position and a second up position,
wherein the first and second up positions of the lower piston assembly are defined by contact with a lower portion of the upper piston assembly to establish (i) the first up position of the lower piston assembly when the upper piston assembly is in its down position and (ii) the second up position of the lower piston assembly when the upper piston assembly is in its up position;
a first port through the cylinder housing for selectively pressurizing a lower pressure action surface area of the lower piston assembly and a second port through the cylinder housing for selectively pressurizing an upper pressure action surface area of the lower piston assembly;
a third port through the cylinder housing for selectively pressurizing a lower pressure action surface area of the upper piston assembly and a fourth port through the cylinder housing for selectively pressurizing an upper pressure action surface area of the upper piston assembly; and
a fixed sealing member located within the cylinder housing to sealingly separate the upper pressure action surface area of the lower piston assembly from the lower pressure action surface area of the upper piston assembly.

9. The filling system of claim 8, wherein the fixed sealing member comprises a stop cylinder with an external seal in contact with the cylinder housing.

10. The filling system of claim 8 wherein:
pressurized fluid applied at the first port urges the lower piston assembly upward and pressurize fluid applied at the second port urges the lower piston assembly downward;
pressurized fluid applied at the third port urges the upper piston assembly upward and pressurize fluid applied at the fourth port urges the upper piston assembly downward.

11. The filling system of claim 10 wherein:
when pressurized fluid is applied at the first port and the fourth port, a downward urging force on the upper piston assembly is greater than an upward urging force on the lower piston assembly.

12. The filling system of claim 8, further comprising:
a set of port valves for selectively connecting each of the first, second, third and fourth ports to either a pressurized fluid source or ambient; and
a controller connected to the set of port valves to carry out a container fill operation by sequentially moving the lower piston assembly from the down position, then to the first up position, then to the second up position, then to the first up position and then back down to the down position.

13. The filling system of claim 8, further comprising:
a set of port valves for selectively connecting each of the first, second, third and fourth ports to either a pressurized fluid source or ambient; and
a controller connected to the set of port valves, the controller configured such that only one of the first port or the second port is connected to receive pressurized fluid at any given time and only one of the third port or the fourth port is connected to receive pressurized fluid at any given time.

14. A filling system, comprising:
a filling valve including an outlet opening and an axially movable plunger having a sealing end movable relative to the outlet opening between an outlet closing position, an outlet fully open position and at least one outlet partially open position;
a pneumatic actuator operatively connected to move the plunger, the pneumatic actuator including:
a cylinder housing;
an upper piston assembly movable along the cylinder housing between a down position and an up position, and
a lower piston assembly movable along the cylinder housing between a down position and at least a first up position and a second up position,
wherein the first and second up positions of the lower piston assembly are defined by contact with a lower portion of the upper piston assembly to establish (i) the first up position of the lower piston assembly when the upper piston assembly is in its down position and (ii) the second up position of the lower piston assembly when the upper piston assembly is in its up position;
a first port through the cylinder housing for selectively pressurizing a lower pressure action surface area of the lower piston assembly and a second port through the cylinder housing for selectively pressurizing an upper pressure action surface area of the lower piston assembly;
a third port through the cylinder housing for selectively pressurizing a lower pressure action surface area of the upper piston assembly and a fourth port through the cylinder housing for selectively pressurizing an upper pressure action surface area of the upper piston assembly; and
a fixed sealing member located within the cylinder housing to sealingly separate the upper pressure action surface area of the lower piston assembly from the lower pressure action surface area of the upper piston assembly;
wherein a part of the upper piston assembly passes through the sealing member to place the lower portion of the upper piston assembly below the fixed sealing member.

15. The filling system of claim 14, wherein the part of the upper piston assembly that passes through the fixed sealing member is a shaft.

16. The filling system of claim 15, wherein the fixed sealing member comprises a stop cylinder with an external seal in contact with the cylinder housing and an internal seal in contact with the shaft.

* * * * *